Dec. 4, 1956 W. T. RENTSCHLER 2,772,614
INTRA LENS SHUTTER
Filed Dec. 17, 1952 2 Sheets-Sheet 1
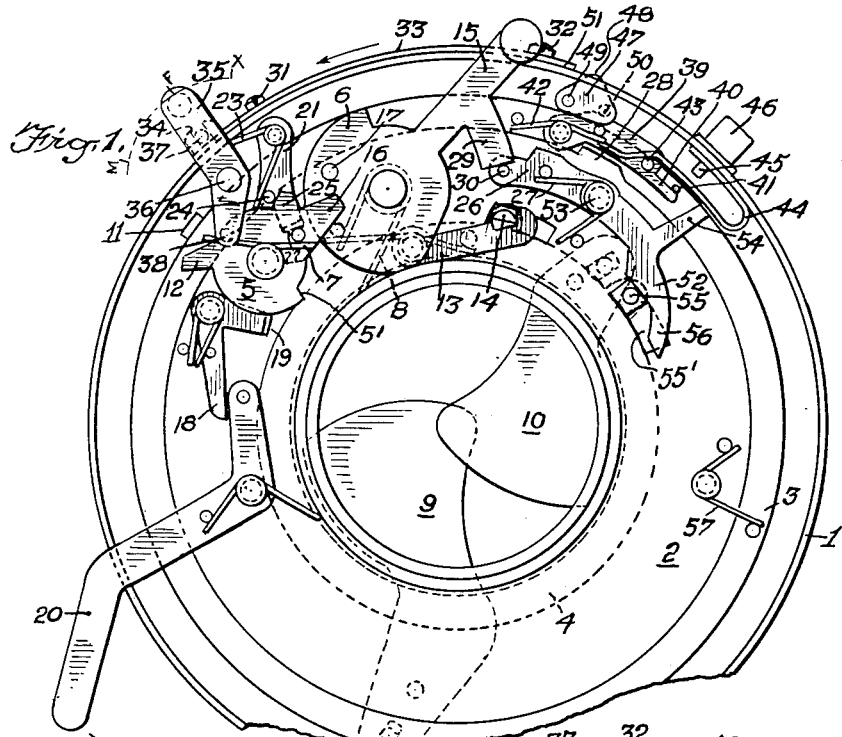
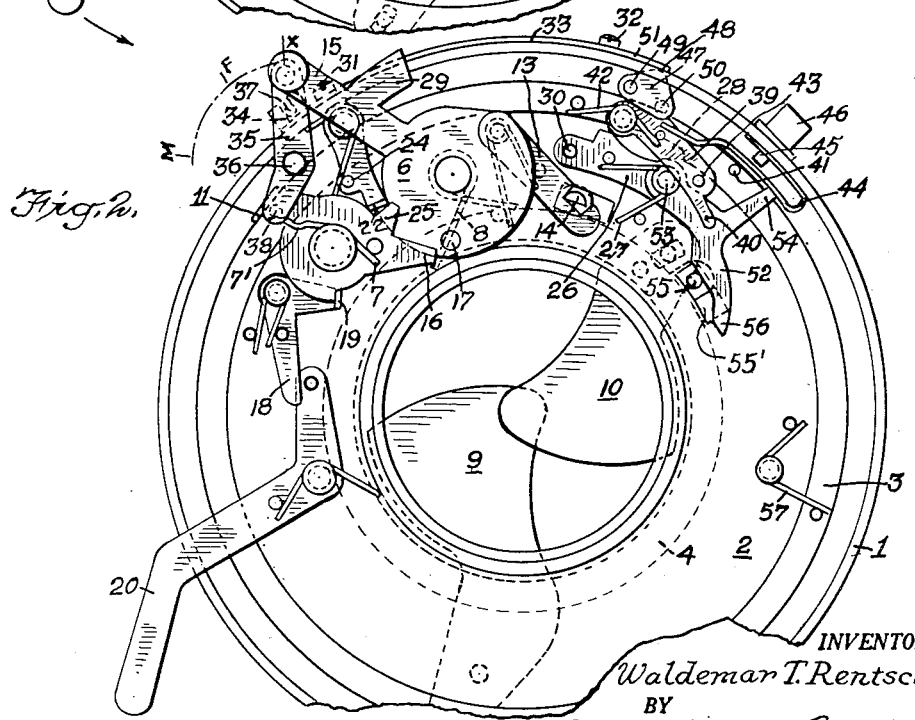
INVENTOR.
Waldemar T. Rentschler
BY
Munn, Liddy & Nathanson
Attorneys Dec. 4, 1956  W. T. RENTSCHLER  2,772,614
INTRA LENS SHUTTER
Filed Dec. 17, 1952  2 Sheets-Sheet 2
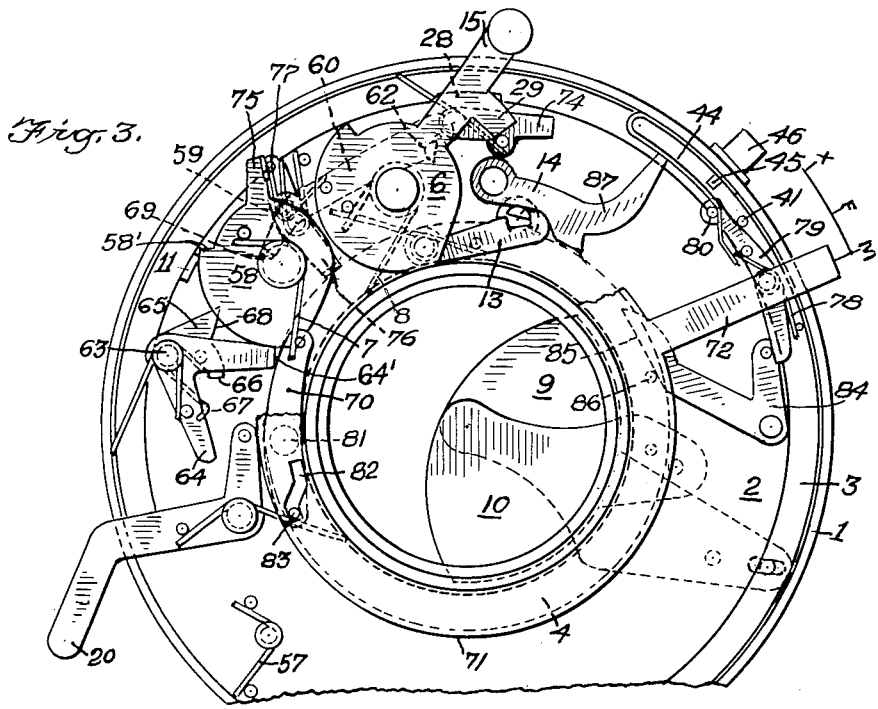
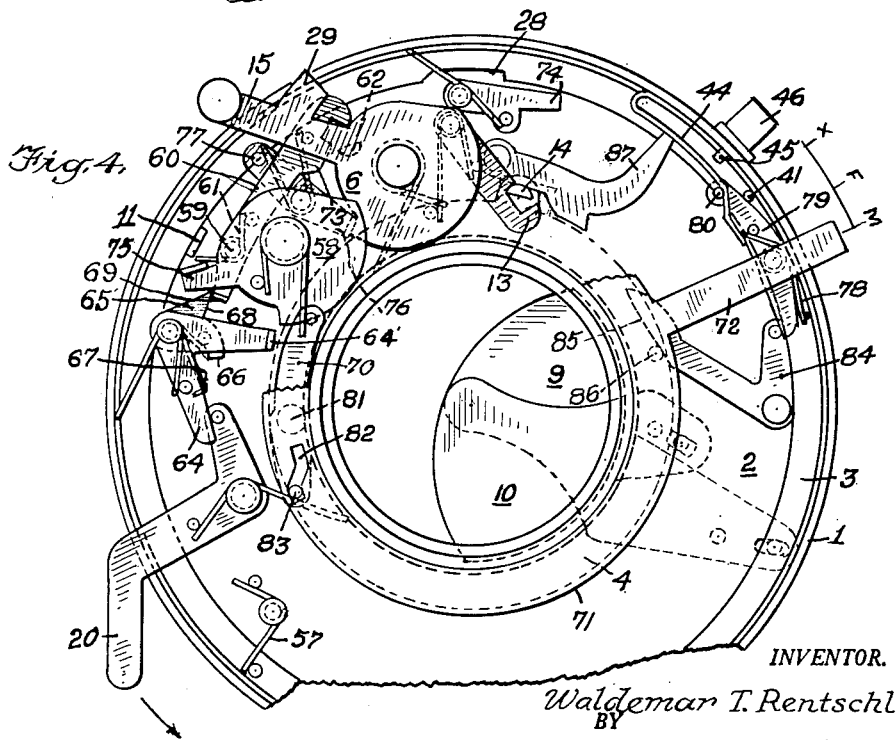
INVENTOR.
Waldemar T. Rentschler
BY
Munn, Liddy & Nathanson
Attorneys United States Patent Office 2,772,614
Patented Dec. 4, 1956

2,772,614

INTRA LENS SHUTTER

Waldemar Traugott Rentschler, Calmbach (Enz), Germany, assignor to Alfred Gauthier G. m. b. H., Calmbach (Enz), Germany, a corporation of Germany Application December 17, 1952, Serial No. 326,466

Claims priority, application Germany January 26, 1952

13 Claims. (Cl. 95—11.5)

The present invention relates to a novel intra-lens camera shutter of the type provided with cover blades and a flash contact.

More particularly, this invention relates to a camera shutter which is equipped with an additional shutter blade system besides the normal shutter blade system and which is coupled with the shutter mechanism for regulating the exposure time of the light sensitive material. These cover blades are opened before the opening of the normal shutter blades and closed after the closing of the normal shutter blades.

In my novel shutter, the cover blades are provided with their own power source which is actuated by the shutter release lever. At the same time the flash contact is closed. The movement of the driving elements for the cover blades in turn releases the driving elements for the normal shutter blades. It is apparent that the movement of the cover blades will not expose the light sensitive material. In the present invention the inertia momenta of the cover blades and their driving elements are selected relatively large by providing relatively large inert masses and suitable geometric proportions. By this means as well as by the selection of suitable spring constants for the drive spring of the cover blade actuating mechanism, it is possible to provide a time interval between the moment of flash contact closure and the time at which the normal shutter blades are opened. These elements are selected so as to provide a time interval which corresponds to the lag in time between the instant of flash contact closure and the instant of maximum light intensity of the flash bulb. In order to allow for different time intervals, depending upon what type flash bulb is used, there is an adjustment which will change the spring constant of the drive spring for the cover blades and thus provide for different time intervals. It has been found that three such adjustments give sufficient variation for all types.

In any camera which is used in connection with a flash bulb, it is desirable to provide a time lag between the time of closing of the flash contact and the opening of the shutter. In most modern shutters, this delay is provided by means of special retarding or delay mechanisms. These mechanisms involve the use of extra parts which must be arranged inside the shutter and thus materially increase the cost of manufacture of the shutter.

This invention provides a novel shutter of the type described wherein the desired time delay is provided without the use of any special delay or retarding mechanism.

The invention also provides for the synchronization of different types of flash bulbs with all exposure times for an intra-lens shutter of the type described.

A further object of this invention is the provision of a novel shutter having cover blades and wherein the desired time lag is obtained by means of the inertia of the members to be accelerated for opening the cover blades.

A still further object of this invention is the provision of a shutter of the type described wherein an adjustment device is provided which makes possible the adjustment of the time lag in accordance with the type of flash bulb used.

Other objects and advantages of the present invention will become more apparent as it is described below in detail with particular reference to the accompanying drawings wherein Fig. 1 is a top view of the shutter unit, the shutter element being shown in its normal position of rest.

Fig. 2 is a view similar to Fig. 1 wherein the shutter is in set position.

Fig. 3 is a top view of another embodiment of the shutter with the shutter in rest position.

Fig. 4 is a view similar to Fig. 3 wherein the shutter is shown in the position just following actuation of the release lever.

In Figures 1 and 2 there is shown a shutter housing 1 having a base plate 2. Blade ring 3, connected with the cover blades 9, only one of which is shown for purposes of clarity, and blade ring 4, associated with the normal shutter blades 10, only one of which is shown for purposes of clarity, are rotatably supported on base plate 2.

These blade rings 3 and 4 are driven by spring housings 5 and 6 respectively, associated respectively with springs 7 and 8. Blade ring 3 is provided with a lug 11 having a sloped surface for engagement with an arm 12 of spring housing 5. The connection between spring housing 6 and blade ring 4 is effected by a notched pawl 13 on the housing which engages a pin 14 on blade ring 4 by means of its notch. Cocking lever 15 for setting the springs is also fixed on housing 6. For simultaneously setting the spring housings 5 and 6, housing 5 is provided with arm 16 which has a sloped surface for engagement with a pin 17 on housing 6. When the setting operation is complete spring housing 5 is latched in the bent up arm 19 of bell crank lever 18 and pin 17 leaves the arm 16. This condition is represented in Fig. 2. Spring housing 6 is held in this set position by means of a lever 21 having a bent up portion 22. Lever 21 is influenced by a spring 23 engaging a pin 24 on the lever. Bell crank lever 18 is actuated by means of the shutter release lever 20.

A lever 26 is pivoted on pin 53 and acts to hold blade ring 3 in the open position of the cover blades. Under the action of a spring 27 this lever can fall into a notch 28 of blade ring 3. In order to disengage this connection the cocking lever 15 on spring housing 6 is provided with an arm 29 for engagement with a pin 30 mounted on lever 26. On the circumference of the shutter housing are mounted screws 31 and 32, which serve as guides for a slide 33. This slide 33 is provided with an upstanding bifurcated member 34. The slide is actuated by means of a lever 35 fixed on a pivot pin 36 on the base plate. One arm of this lever is provided with a pin 37 which engages the member 34 to actuate the slide. A pin 38 is fixed on the other arm of lever 35 and it serves as a counter support for one end of spring 7. In the illustrated embodiment lever 35 has three latch positions, the stop positions "X" and "M" as well as position "F," which last position is fixed by means of portion 7' of spring 7.

A lever 39 is pivotally mounted on cover blade ring 3 and rests with its portion 40 against a pin 41 on blade ring 3. Lever 39 is also provided with a pin 43. When blade ring 3 is moved counterclockwise this pin 43 lays the contact spring 44 on the shutter housing against the middle pin 45 of the flash fitting 46. This middle pin 45 is insulated from the shutter housing. The flash circuit is closed during this operation when the spring 42 overcomes the contact spring 44.

A lever 47 having a cam 48 is mounted on a pivot 49 on the base plate. This lever may engage lever 39 by means of a pin 50, but this engagement is effected only when slide 33 is set in the position shown in Fig. 2, i. e., when lever 35 is in the "X" position. When this condition exists slide 33 engages cam 48 of lever 47 by means of end 51 of the slide. This will swing lever 47 in clockwise direction and result in swinging lever 39 clockwise because of the engagement of pin 50 with lever 39. When lever 39 is thus swung in clockwise direction pin 43 can no longer engage contact spring 44 during the movement of blade ring 3.

An additional lever 52 is pivotally mounted at 53 with the lever 26. This lever 52 has an arm 54 resting against contact spring 44. Lever 52 is also provided with a control cam 56. This control cam 56 cooperates with a pin 55 fixed on blade ring 4 and will effect a contact closure as soon as the normal shutter blades open. Pin 55 extends through opening 55' in base plate 2.

A spring 57 serves to return blade ring 3 to rest position from the latched position in which it is held by lever 26.

The operation of the embodiment of Figs. 1 and 2 will be described below.

Spring housings 5 and 6 are cocked by actuating the cocking lever 15 in the direction of the arrow shown at the top of Fig. 1. The pin 17 engages with arm 16 of spring housing 5 and turns the housing in a clockwise direction. As soon as the edge 5' of the housing 5 has passed lug 19 of bell crank lever 18, lever 18 latches the housing in cocked position. At this time pin 17 leaves arm 16 and spring housing 6 is latched by lug 22 of lever 21 after a short additional movement, as shown in Fig. 2.

When release lever 20 is actuated in the direction of the arrow at the bottom of Figure 1, lever 18 is rotated in a clockwise direction and sets spring housing 5 free. This housing actuates blade ring 3 by means of arm 12, which has slid over the sloped surface of lug 11 and fallen behind it during the setting movement.

When lever 35 is adjusted to the "F" or "M" position, contact spring 44 is forced against counter contact 45 by pin 43 when the shutter blade ring 3 moves, and the flash circuit is closed. As a result of the movement of blade ring 3 the cover blades are opened. When the open position is reached ring 3 is latched by the engagement of lever 26 with notch 28. Before housing 5 reaches its end position, its arm 25 engages pin 24 of lever 21 and rotates the lever clockwise, thus freeing spring housing 6. Then the movement of the normal shutter blades takes place in the manner known in the art.

Movement of blade ring 4 may be regulated by an escapement mechanism such as is known in the art but not here shown. Before housing 6 reaches rest position its arm 28 engages pin 30 and swings lever 26 in a counter-clockwise direction. Blade ring 3 is thereby set free and is returned to starting position by spring 57.

When lever 35 is adjusted to the "X" position, as shown in Fig. 2, the flash contact is not closed by movement of the blade ring 3. In this case, rather, the switch 44, 45 is closed only when the normal shutter blades are released to completely open the shutter. Contact closure is then effected by the cooperation of pin 55 on blade ring 4 with control cam 56, which turns lever 52 counter-clockwise. By the adjustment of lever 35 the spring constant of spring 7 may be regulated and thus the acceleration of the cover blades regulated.

Figs. 3 and 4 illustrate another embodiment of the mechanism for setting drive springs 7 and 8. These figures also show another adjusting device for the selection of different "lag" times. Like elements as in Figs. 1 and 2 have the same reference characters in Figs. 3 and 4.

In this embodiment, unlike that of Figs. 1 and 2, the simultaneous setting of housings 58 and 6 is not effected by direct cooperation of these elements. A notched pawl 60 is mounted on pin 59 of housing 58 and is urged in a clockwise direction by a spring 61. The pawl can engage a pin 62 on housing 6 by means of its notch. Pin 62 is semicircular in cross-section. A lever 65 is pivotally mounted on a pin 63. Another lever 64, corresponding to lever 18 of Figs. 1 and 2 is also mounted on pin 63. Lever 65 is provided with a stop 66 which is urged against lever 64 by means of spring 67. This lever 65 has a shoulder 68 which engages with a bent up lug 69 on pawl 60. The spring constant of spring 7 may be regulated (pre-set) by means of lever 70 and an adjusting ring 71 provided with an actuation arm 72.

The operation of the embodiment of Figs. 3 and 4 will be described below.

To set the shutter, the lever 15 is moved in a counter-clockwise direction, thus rotating housing 6 until the upstanding lug on the end of lever 76 falls into the notch of housing 6 to hold it in set position. At the same time housing 58 will be rotated by virtue of the engagement of pawl 60 with pin 62 until the housing 58 has been rotated so far that the upstanding lug 64' on the end of one arm of lever 64 has fallen behind the notch 58' in housing 58. The shutter is then in set position.

By actuating release lever 20 in the direction of the arrow in Fig. 4 lever 64 is swung in a clockwise direction. This lever in turn swings lever 65 in the same direction by virtue of its engagement with stop 66. Shoulder 68 of lever 65 engages the bent-up lug 69 of pawl 60 and moves it out of engagement with pin 62, as shown in Fig. 4. Shoulder 68 of lever 65 is made so large that lug 69 of pawl 60 slides on it until pawl 60 is supported and guided on pin 62 by its edge 73.

Upon further swinging of lever 64 lug 64' swings out of the notch in housing 58 and the housing is set free. Housing 58 in turn releases housing 6 when its arm 75 engages pin 77 on lever 76 and rotates the lever out of engagement with the notch in housing 6.

The remaining operations of this embodiment are similar to those described for Figs. 1 and 2. Blade ring 3 is latched in lever 74 by its notch 28. A lever 79 is pivoted on blade ring 3 and urged in clockwise direction by spring 78 against pin 41. Upon movement of blade ring 3 this lever effects the closure of contact 44, 45 by means of its pin 80.

A lever 70, pivoted on pin 81 in the base plate is provided for pre-setting spring 7. This lever has a pin 83 fixed on one arm thereof which engages the adjusting ring 71 by virtue of guide slot 82 in the ring. The position of lever 79 relative to contact spring 44 is regulated by lever 84. This lever 84 is provided with a control cam 85 which cooperates with a pin 86 on adjusting ring 71. Control cam 85 is shaped such that each position of arm 72 corresponds with a different position of lever 79. When arm 72 is adjusted to the "X" position arm 79 is swung so far in a counterclockwise direction that pin 80 cannot influence contact spring 44 during the movement of shutter blade ring 3. When the arm 72 is thus adjusted to the "X" position contact closure takes place by means of lever 87 at the moment the normal shutter blades open. Movement of lever 87 is controlled by pin 14 on blade ring 4.

In both embodiments of the invention shown in the drawings there results a time interval between the moment the flash contact 44, 45 is closed and the time the shutter is opened by operation of the normal shutter blades 10. The time interval results from the fact that the drive elements for the cover blades as well as the cover blades themselves must be accelerated, and the fact that spring housing 6 is not released until spring housing 5 (or 58) has completed its movement. In applicant's shutter the "lag" times necessary for the synchronization of different kinds of flash with high shutter speeds are provided for in this interval. The magnitude of this time interval is determined by the inertia momenta of the drive elements for the cover blades as well as of the cover blades themselves and by the acceleration of these elements. Adjustments are provided to vary this acceleration. The inertia momenta of the cover blades and their drive elements can be selected relatively large by properly proportioning their inert masses and geometrical proportions. Regulation of the moment of contact closure relative to the operation of the normal shutter blades is also possible since the actuating element of one contact portion is on the cover blade ring and its position is changed with relation to its contact by different adjustments of arm 72, as shown in Figs. 3 and 4. In the embodiment of Figs. 3 and 4 this adjustment is possible as well as the adjustment for varying the spring constant of the drive spring.

It is an essential element of the invention that the "lag" times for flash synchronization be realized without the use of a special delaying mechanism and also that the "lag" times are provided for within the time interval resulting from the inertia of the masses to be accelerated in opening the cover blades between the time of contact closure and the time when the normal shutter blades open.

While the invention has been shown and described in the preferred forms, it is obvious that many changes and modifications may be made without departing from the spirit of the invention as defined in the following claims.

I claim:

1. A photographic intra-lens shutter of the type provided with a flash contact comprising a set of normal shutter blades, a power system for actuating said normal shutter blades, a set of cover shutter blades, a second independent power system for actuating said cover blades, means to simultaneously set both of said power systems, release means to release said cover blade power system and close the flash contact, said cover blade power system being provided with means to release said normal power system, the arrangement of parts being such that a predetermined time lag exists between the time the flash contact is closed and the time the normal shutter blades are opened.

2. A photographic intra-lens shutter according to claim 1 wherein an adjusting device is provided for adjustment of the moment of closure of the flash contact to the type flashbulb used.

3. A photographic intra-lens shutter of the type provided with a flash contact comprising a base plate, a normal shutter blade ring rotatably mounted thereon, a plurality of normal shutter blades mounted on said ring and actuated thereby, a spring housing for actuating said normal blade ring, spring power means for driving said housing, a cover blade actuating ring, a plurality of cover blades pivotally mounted thereon and actuated thereby, a spring housing for actuating said cover blade ring, spring power means for driving said cover blade actuating housing, means for simultaneously cocking said normal blade and said cover blade actuating housings, means for releasing said cover blade actuating housing so as to actuate said cover blade ring, said cover blade actuating housing having means thereon to release the normal blade housing a predetermined time after release of said cover blade housing, and means mounted on said cover blade ring to close said flash contact upon release of said cover blade housing.

4. A photographic intra-lens shutter in accordance with claim 3 wherein means are provided to render said flash contact closing means inoperative.

5. A photographic intra-lens shutter according to claim 3 wherein said cocking means includes a lever fixed on said normal blade housing, a pin on said normal blade housing, and an arm formed on said cover blade housing, said pin and said arm directly engaging when said lever is operated so as to cock said normal blade spring and said cover blade spring, said pin and said arm disengaging when said cocking operation is completed.

6. A photographic intra-lens shutter according to claim 5 wherein lever means are provided for holding said normal blade housing and said cover blade housing in cocked position.

7. A photographic intra-lens shutter according to claim 3 wherein said cocking means includes a pawl pivotally mounted on said cover blade housing, a pin mounted on said normal blade housing, said pin and said pawl providing a connection between said housings for the simultaneous cocking thereof, said release means providing for the release of said pawl prior to the release of said housings.

8. A photographic intra-lens shutter in accordance with claim 3 wherein adjusting means is provided to change the tension of the cover blade spring power means and thus regulate the time interval between the time of closing of the flash contact and the time of opening of the normal shutter blades.

9. A photographic intra-lens shutter in accordance with claim 8 wherein said adjusting means is a two-armed lever pivotally mounted on said base plate, one arm of said lever serving as an abutment for said cover blade spring power means, said lever latching in different positions.

10. A photographic intra lens shutter according to claim 3 wherein said flash contact closing means includes a two-armed lever pivotally mounted on said cover blade actuating ring and a pin on one arm of said two-armed lever, said pin serving to close said flash contact upon actuation of said cover blade ring.

11. A photographic intra-lens shutter according to claim 10 wherein adjusting means is provided for controlling the operation of said flash contact closing means, said adjusting device comprising a bell crank lever pivotally mounted on said base plate and having a cam surface formed on the end of one arm thereof, a pin on the other arm thereof for engagement with an arm of said two-armed lever, an adjusting ring rotatably mounted on said base plate, and a pin on said adjusting ring for engagement with said cam surface so that the two-armed lever may be adjusted to different positions with relation to the flash contact.

12. A photographic intra-lens shutter in accordance with claim 11 wherein means is also provided for adjusting the tension of said cover blade spring power means, said tension adjusting means also being actuated by said adjusting ring when said ring is moved to adjust the position of said two-armed lever.

13. In a camera shutter having a rotatable shutter blade actuating ring, the combination therewith of a flash switch resilient contact member, a spring-actuated lever carried by and fulcrumed on said ring, a pin on said lever for actuating said resilient contact member upon the movement of said lever in response to the shutter blade opening movement of said ring before the opening of the shutter, a base plate, a cam lever carried by and fulcrumed on said plate, means on said spring actuated lever which cooperates with said cam lever to depress said spring actuated lever to render the pin thereof inoperative to actuate the resilient contact member, and manually operable means movable on said plate to operate said cam lever, said manually operable means including a slide movable to operate said cam lever, a manually operable lever fulcrumed on said base plate, and cooperative means on said slide and the manually operable lever for operating the slide; a rotatable driving member on said base plate, driving said blade ring, a spring for rotating the driving member in one direction, said manually operable lever having means which cooperates with said spring upon movement of said manually operable lever into different positions of adjustment to tension said spring to change the speed of the driving member under the action of the spring.

References Cited in the file of this patent

UNITED STATES PATENTS

| | | |
|---|---|---|
| 2,448,876 | Fuerst | Sept. 7, 1948 |
| 2,552,273 | Fuerst | May 8, 1951 |

FOREIGN PATENTS

| | | |
|---|---|---|
| 222,270 | Switzerland | Oct. 1, 1942 |